(12) United States Patent
Kashima et al.

(10) Patent No.: US 8,848,767 B2
(45) Date of Patent: Sep. 30, 2014

(54) TRANSCEIVER FOR COMMUNICATING SIGNAL ENCODED TO INCLUDE CLOCK INFORMATION

(75) Inventors: Hideki Kashima, Kariya (JP); Tomohisa Kishigami, Obu (JP); Naoji Kaneko, Toyokawa (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/490,804

(22) Filed: Jun. 7, 2012

(65) Prior Publication Data
US 2012/0314738 A1 Dec. 13, 2012

(30) Foreign Application Priority Data
Jun. 8, 2011 (JP) .................................. 2011-128222

(51) Int. Cl.
| | | |
|---|---|---|
| *H04B 1/38* | (2006.01) | |
| *H04L 5/16* | (2006.01) | |
| *H04L 25/49* | (2006.01) | |
| *H04L 12/403* | (2006.01) | |
| *H04J 3/06* | (2006.01) | |
| *H04L 7/033* | (2006.01) | |

(52) U.S. Cl.
CPC .......... *H04L 12/403* (2013.01); *H04L 25/4902* (2013.01); *H04J 3/0697* (2013.01); *H04L 7/0331* (2013.01)
USPC .......................................................... 375/219

(58) Field of Classification Search
CPC ........................... G06F 13/4234; H04W 88/06
USPC .................. 375/211, 354, 355, 360
See application file for complete search history.

(56) References Cited

U.S. PATENT DOCUMENTS

| | | | | |
|---|---|---|---|---|
| 5,787,132 A | * | 7/1998 | Kishigami et al. ............. | 375/354 |
| 6,704,545 B1 | * | 3/2004 | Wala ............................... | 455/16 |
| 6,718,476 B1 | * | 4/2004 | Shima ........................... | 713/400 |
| 2004/0008060 A1 | * | 1/2004 | Watanabe ..................... | 327/116 |

FOREIGN PATENT DOCUMENTS

JP 2001-077799 3/2001

OTHER PUBLICATIONS

M. Sato, "Detailed Description of Vehicle Network System", Dec. 1, 2005, pp. 70-77 with English translation.
Office action dated Aug. 27, 2013 in corresponding Korean Application No. 10-2012-0061479.

* cited by examiner

*Primary Examiner* — Chieh M Fan
*Assistant Examiner* — Wednel Cadeau
(74) *Attorney, Agent, or Firm* — Harness, Dickey & Pierce, PLC

(57) ABSTRACT

In a transceiver, a clock generator generates a second clock synchronized with a first clock. The second clock has a period corresponding to a duration of one bit of a digital signal. When first transmission data is supplied to the transceiver with being asynchronous to the second clock, a sampling timing generator detects start data of the first transmission data as a start timing, and generates sampling timings based on the first clock in response to the start timing. The sampling timings have intervals each of which is defined to correspond to the period of the second clock. The first sampling timing is spaced from the start timing. A sampling module samples, at each of the sampling timings, the first transmission data, thus generating second transmission data synchronized with the second clock.

15 Claims, 12 Drawing Sheets

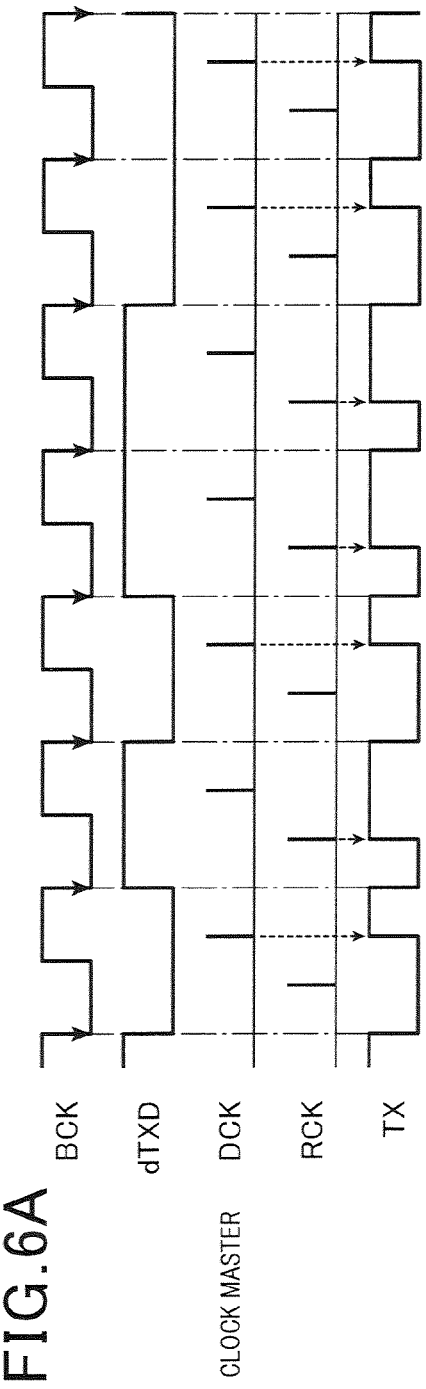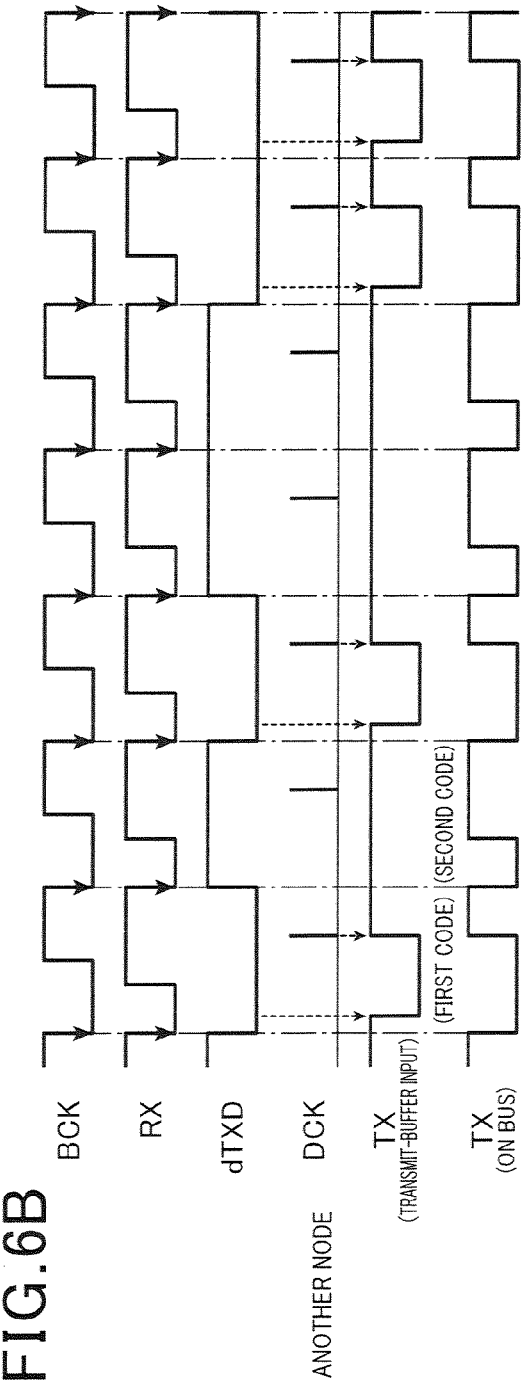

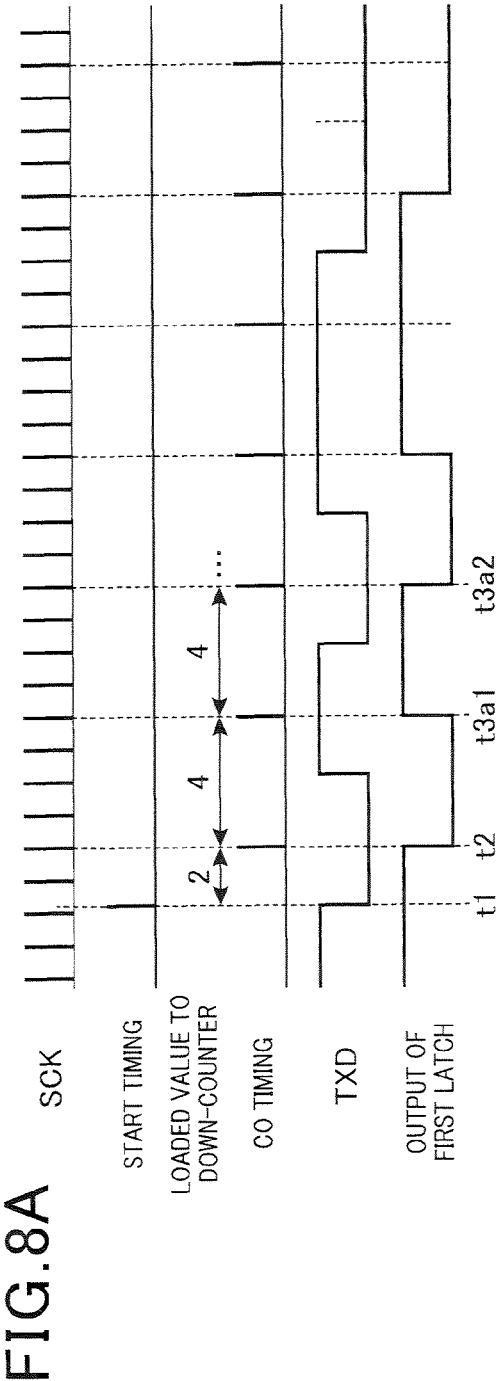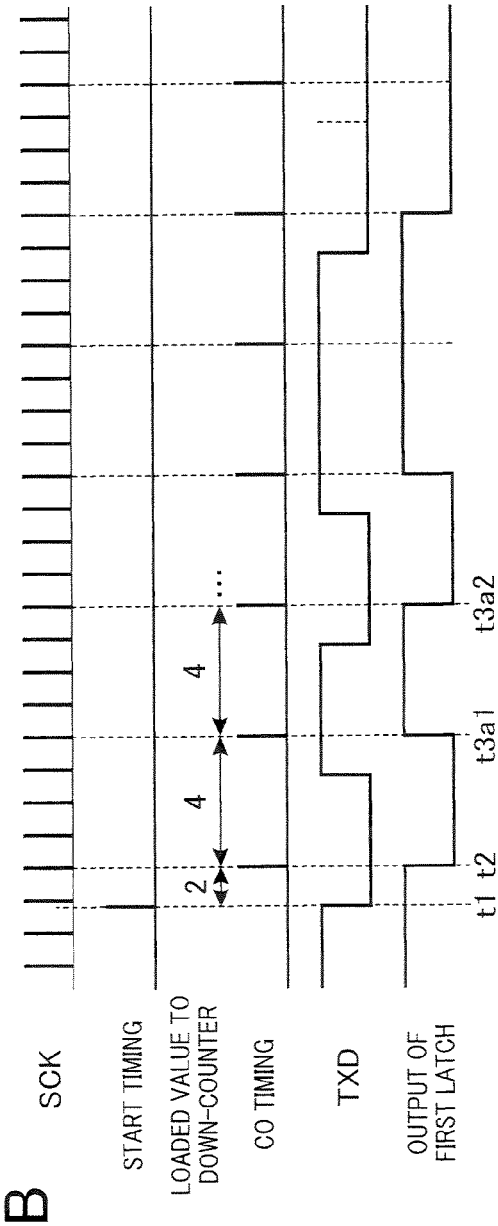

TRANSCEIVER FOR COMMUNICATING SIGNAL ENCODED TO INCLUDE CLOCK INFORMATION

CROSS REFERENCE TO RELATED APPLICATIONS

This application is based on Japanese Patent Application 2011-128222 filed on Jun. 8, 2011. This application claims the benefit of priority from the Japanese Patent Application, so that the descriptions of which are all incorporated herein by reference.

TECHNICAL FIELD

The present disclosure relate to transceivers for transmitting and receiving, via communication buses, digital signals encoded to include data and clock information.

BACKGROUND

Communication systems based on communication buses, such as CAN buses and LIN buses, are frequently used as those which are installable in motor vehicles. For example, such communication systems are disclosed in "DETAILED DESCRIPTION OF VEHICLE NETWORK SYSTEM", MICHIO SATO, published on Dec. 1, 2005, CQ PUBLISHING CO., LTD.

A communication system of this type is comprised of a plurality of nodes communicably connected to a communication bus; these nodes are, for example, hardware computing terminals or software modules. Each node in the communication system is equipped with a signal processor, such as a CPU and a sequencer, and a transceiver for transmitting and receiving, via the communication bus, an encoded digital signal; the encoded digital signal includes sampled data from a transmission data signal supplied from the signal processor and clock information.

In order to improve data transfer efficiency of such a communication system, it is desirable to synchronize the transceivers of the respective nodes in a communication system with each other.

One technical approach to implement such synchronization is known. The technical approach is designed such that the transceiver of a node samples data from a transmission data signal supplied from the signal processor, and encodes the sampled data such that an encoded digital signal includes the sampled data and clock information. Then, the transceiver transmits the encoded digital signal to a communication bus.

At that time, an alternative node recovers the clock information from the encoded digital signal on the bus communication. Then, the alternative node divides the frequency of a self-clock generated by itself to generate a bus clock, which is synchronized with a clock defined by the clock information, so that the transceiver operates on the bus clock.

Recently, in view of reduction in power consumption and in cost, the transceiver of each node of these communication systems can be equipped with a simple oscillator, such as a ring oscillator, for generating a self-clock with a frequency (clock frequency) being of moderate accuracy.

SUMMARY

The signal processor of each node is normally configured to operate on its own clock different from the bus clock generated by the transceiver. This means that the signal processer of each node is asynchronous to the transceiver.

That is, the transceiver of a node, which operates on the bus clock, could sample each bit (1 or 0), which corresponds to a preset high signal level or a preset low signal level, of a transmission data signal supplied from the signal processor at the midpoint of a duration (width) of a corresponding bit if the signal processor operated on the bus clock.

However, because the signal processor operates on its own clock different from the bus clock generated by the transceiver, the transceiver may sample bits (signal levels) from a transmission data signal supplied from the signal processor at its transitions from 0 to 1 or 1 to 0. This may cause the transceiver to misrecognize the signal levels (the respective bits) of the transmission data signal supplied from the signal processor.

Because the signal processer of each node is asynchronous to the transceiver, there may be a difference between the period (the length of each cycle) of the bus clock generated by the transceiver and the duration of each bit of transmission data signal supplied from the signal processor. Due to the difference, the position of a sampling point within the duration of each bit of transmission data signal may be gradually shifted from a predetermined position, such as the middle of the duration of a corresponding bit during sampling. For this reason, there is a requirement to determine the position of a sampling point within the duration of the start bit of a transmission data signal at the middle of the width or its vicinity.

Particularly, if the transceiver of each node is equipped with a simple oscillator for generating a self-clock with a frequency being of moderate accuracy, this may likely result in a difference between the repletion period of the bus clock generated by the transceiver and the duration of each bit of transmission data signal supplied from the signal processor. This may increase a need to determine the position of a sampling point within the duration of the start bit of a transmission data signal at the middle or its vicinity of the duration.

In view of the circumstances set forth above, one aspect of the present disclosure seeks to provide transceivers for transmitting and receiving a digital signal encoded to include data and clock information, which are designed to address at least one of the problems and/or the requirement set forth above.

Specifically, an alternative aspect of the present disclosure aims to provide such transceivers capable of reducing misrecognition of signal levels, i.e. bits, of a transmission data signal, in other words, capable of properly sampling signal levels of a transmission data signal.

A further aspect of the present disclosure aims to provide transceivers for transmitting and receiving a digital signal encoded to include data and clock information, which are capable of meeting the need to determine the position of a sampling point within the duration of the start bit of a transmission data signal at the middle of the duration or its vicinity.

According to a first exemplary aspect of the present disclosure, there is provided a transceiver for communicating a digital signal encoded to include information of a first clock through a communication bus. The transceiver includes a clock generator configured to generate a second clock synchronized with the first clock. The second clock has a period corresponding to a duration of one bit of the digital signal. The transceiver includes a sampling timing generator configured to, when first transmission data is supplied to the transceiver with being asynchronous to the second clock, detect start data of the first transmission data as a start timing, and generate sampling timings based on the first clock in response to the start timing. The sampling timings have intervals each of which is defined to correspond to the period of the second clock, and the first sampling timing in the sampling timings is spaced from the start timing. The transceiver includes a sampling module configured to sample, at each of the sampling timings, the first transmission data, thus generating second transmission data synchronized with the second clock. The transceiver includes a transmitter configured to encode the second transmission data to the digital signal, and transmit the digital signal through the communication bus.

The first exemplary aspect of the present disclosure determines the sampling timings for the first transmission data such that the sampling timings have intervals each of which is defined to correspond to the period of the second clock, and the first sampling timing in the sampling timings is spaced from the start timing. This ensures an interval between a level-transition of each bit in the first transmission data and a corresponding sampling timing of the corresponding bit. Thus, it is possible to properly sample bits of the first transmission data.

In a first structural type of the first exemplary aspect of the present disclosure, the clock generator is configured to generate a multiplication clock having N level-transition edges as sampling edges within each cycle of the second clock where the N is an integer equal to or greater than 3, and the sampling timing generator is configured to generate a corresponding one of the sampling timings each time a (P+k•N)-th sampling edge of the multiplication clock occurs after detection of the start timing where the P is (N+1)/2 when N is an odd number and P=(N+2)/2 when N is an even number, and k is 0, 1, 2, . . . , KLIM where KLIM is an upper limit of the k which is determined based on a length of the transmission data.

As the level-transition edges as the sampling edges, the rising edges, the falling edges, or both the rising edges and falling edges of the multiplication clock be used. If the raising edges or falling edges of the multiplication clock are only used as the sampling edges, the multiplication clock is an N multiple of the second clock in frequency, in other words, an N submultiple of the second clock in period. Otherwise, if both the raising edges and falling edges of the multiplication clock are used as the sampling edges, the multiplication clock is a 2N multiple of the second clock in frequency, in other words, a 2N submultiple of the second clock in period. The configuration of the first structural type of the first exemplary aspect of the present disclosure determines the first sampling timing of the start data of the first transmission data within the range from the product of the (P−1)/N and the duration of one bit of the first transmission data to the product of the P/N and the duration of one bit of the first transmission data. This results in the ensuring of a margin between a level-transition of each bit in the first transmission data and a corresponding sampling timing of the corresponding bit; the margin has, even in the worst case, a length equal to the quarter of the duration of a corresponding bit of the first transmission data. Therefore, it is possible to properly sample bits of the first transmission data, and reduce misrecognition of bits of the first transmission data, thus improving the reliability of sampled first transmission data.

In a second structural type of the first exemplary aspect of the present disclosure, the sampling timing generator further includes a counter configured to count the duration of one bit of the digital signal according to the first clock as a period count value. The sampling timing generator is configured to generate the first sampling timing at a timing when a half of the period count value corresponding to the duration of one bit of the digital signal is reached by the counter; and generate, after generation of the first sampling timing, a corresponding one of the remaining sampling timings each time the period count value corresponding to the duration of one bit of the digital signal is reached by the counter.

The configuration of the second structural type of the first exemplary aspect of the present disclosure ensures a margin between a level-transition of each bit in the first transmission data and a corresponding sampling timing of the corresponding bit; the margin has a length substantially equal to the half of the duration of a corresponding bit of the first transmission data. Therefore, it is possible to improve the reliability of sampled first transmission data as well as the first example of the first exemplary aspect of the present disclosure, thus further reducing misrecognition of bits of the first transmission data due to a difference between the period of the second clock and the duration of each bit of the first transmission data.

In a third structural type of the first exemplary aspect of the present disclosure, the sampling timing generator further includes a counter configured to count the duration of one bit of the digital signal according to the first clock as a period count value, and an offset-value generator configured to generate an interval between a target edge and the start timing, the target edge is a level-transition edge in the second clock occurring immediately before the start timing. The sampling timing generator is configured to generate the first sampling timing at a timing when a half of the period count value corresponding to the duration of one bit of the digital signal is reached by the counter, and generate, after generation of the first sampling timing, a corresponding one of the remaining sampling timings each time the sum of the offset value and the half of the cyclic-count value is reached by the counter in response to an occurrence of a corresponding level transition edge in the second clock corresponding to the target edge.

The configuration of the third structural type of the first exemplary aspect of the present disclosure ensures the same margin between a level-transition of each bit in the first transmission data and a corresponding sampling timing of the corresponding bit as the second example of the first exemplary aspect of the present disclosure. Thus, it is possible to achieve the same technical effects as the second example does.

According to a second exemplary aspect of the present disclosure, there is provided a communication system. The communication system includes a communication bus, and a plurality of nodes communicably coupled to each other through the bus. Each of the plurality of nodes includes a transceiver for communicating a digital signal encoded to include information of a first clock through the communication bus. The transceiver includes a clock generator configured to generate a second clock synchronized with the first clock. The second clock has a period corresponding to a duration of one bit of a digital signal on the communication bus. The transceiver includes a sampling timing generator configured to, when first transmission data is supplied to the transceiver with being asynchronous to the second clock, detect start data of the first transmission data as a start timing, and generate sampling timings in response to the start timing. The sampling timings have intervals each of which is defined to correspond to the period of the second clock. The first sampling timing in the sampling timings is spaced from the start timing. The transceiver includes a sampling module configured to sample, at each of the sampling timings, the first transmission data, thus generating second transmission data synchronized with the second clock. The transceiver includes a transmitter configured to encode the second transmission data to a digital signal including information of the first clock, and transmit the digital signal through the communication bus.

The second exemplary aspect of the present disclosure determines the sampling timings for the first transmission data such that the sampling timings have intervals each of which is defined to correspond to the period of the second clock, and the first sampling timing in the sampling timings is spaced from the start timing This ensures an interval between a level-transition of each bit in the first transmission data and a corresponding sampling timing of the corresponding bit. Thus, it is possible to properly sample bits of the first transmission data.

The above and/or other features, and/or advantages of various aspects of the present disclosure will be further appreciated in view of the following description in conjunction with the accompanying drawings. Various aspects of the present disclosure can include or exclude different features, and/or advantages where applicable. In addition, various aspects of the present disclosure can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the present disclosure will become apparent from the following description of embodiments with reference to the accompanying drawings in which:

FIG. 6A is a timing chart schematically illustrating operations of an encoder of the master node illustrated in FIG. 5;

FIG. 6B is a timing chart schematically illustrating operations of an encoder of each slave node illustrated in FIG. 5;

FIG. 8A is a timing chart schematically illustrating a first example of operations of the synchronizing circuit;

FIG. 8B is a timing chart schematically illustrating a second example of operations of the synchronizing circuit;

DETAILED DESCRIPTION OF EMBODIMENT

Figure 1:
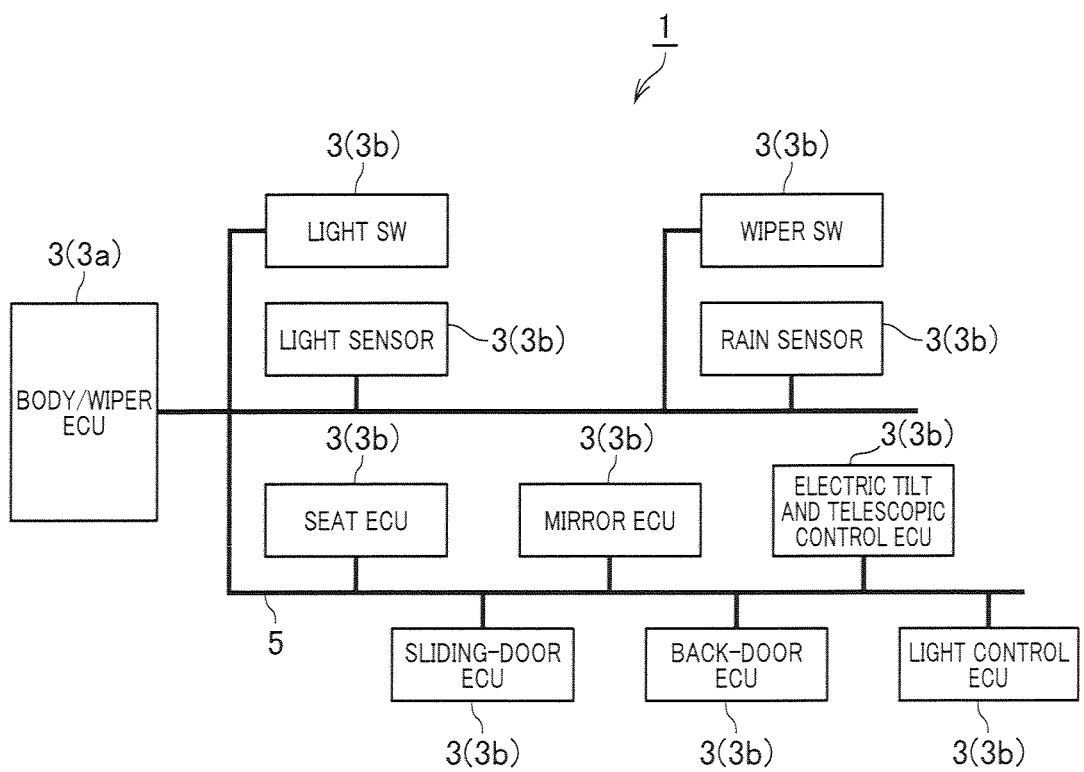
FIG. 1 is a block diagram schematically illustrating an example of the overall structure of a communication system according to a first embodiment of the present disclosure.

Embodiments of the present disclosure will be described hereinafter with reference to the accompanying drawings. In these embodiments, like parts to which like reference characters are assigned are omitted or simplified to avoid redundant description.

First Embodiment

An example of the overall structure of a communication system 1 installed in a motor vehicle as a target vehicle according to a first embodiment of the present disclosure is illustrated in FIG. 1.

The communication system 1 is comprised of a plurality of nodes 3 and communication buses 5 as communication routes through which the plurality of nodes 3 are communicably coupled to each other. Each node 3 is, for example, a hardware computing terminal or a software module. In the first embodiments, the nodes 3 include body ECUs for running body applications (application programs) for automotive-body parts, such as mirrors, door locks, windows, and so on of the target vehicle. The nodes 3 also include devices, such as lighting devices, actuators, and sensors, for measuring the operating conditions of the motor vehicle and for controlling the operating conditions of the target vehicle.

Referring to FIG. 1, the body ECUs of the nodes 3 include, for example, a body/wiper ECU, a seat ECU, a mirror ECU, a sliding-door ECU, a back-door ECU, a light control ECU, an electric tilt and telescopic ECU, and so on. The devices of the nodes 3 include, for example, a light switch (SW), a wiper switch, a light sensor, a rain sensor, and so on.

The wiper switch is normally OFF and turns ON when switched on by a driver of the target vehicle, and the rain sensor is configured to, for example, detect water droplets on the windshield of the target vehicle.

The body/wiper ECU is electrically connected to the rain sensor and a wiper actuator for driving the wiper of the automotive-body parts. The body/wiper ECU is configured to perform overall control of the automotive-body parts of the target vehicle and the other ECUs and all the switches, and particularly control the wiper actuator to activate or deactivate the wiper according to the ON/OFF state of the wiper switch and/or information detected by the rain sensor.

The seat ECU is electrically connected to an actuator for adjusting the position of each seat of the target vehicle. The seat ECU is configured to store therein an optimum position of each seat of the target vehicle and control the actuator for each seat to adjust the position of each seat to the corresponding optimum position when a corresponding power-seat switch is operated.

The sliding-door ECU is installed in the target vehicle if at least one sliding door is installed therein. Specifically, the sliding-door ECU is electrically connected to an actuator for automatically opening the at least one sliding door of the target vehicle when a corresponding door switch is switched with the at least one sliding door closed and for automatically closing the at least one sliding door when the corresponding door switch is switched with the at least one sliding door open.

The mirror ECU is electrically connected to an actuator for adjusting at least one mirror of the target vehicle. The mirror ECU is configured to control the actuator for the at least one mirror to angularly adjust the at least one mirror when a corresponding switch is operated.

The back-door ECU is installed in the target vehicle if a back door is installed therein. Specifically, the back-door ECU is electrically connected to an actuator for automatically opening the back door when a corresponding door switch is switched with the back door closed and for automatically closing the back door when the corresponding door switch is switched with the back door open.

The light switch is provided for each lighting device for illuminating a corresponding area around the target vehicle. The light switch is normally OFF and turns ON when switched on by the driver of the target vehicle. The light sensor is configured to measure a bright level of illumination in front of the target vehicle.

The light control ECU is electrically connected to the light switch, the light sensor, and each lighting device and configured to control at least one lighting device according to the ON/OFF state of a corresponding one of the light switches and the bright level of illumination measured by the light sensor.

The electric tilt and telescopic control ECU serves as an electric steering-position adjustment device and is configured to adjust the tilt and telescope of the steering wheel of the target vehicle.

The communication bus 5 according to this embodiment can have high and low signal levels, for example, high and low voltage levels. The communication bus 5 is designed such that, if a high level portion of a first signal and a low level portion of a second signal are simultaneously outputted to the communication bus 5, the low level portion appears on the communication bus 5, in other words, the second signal wins (the first signal loses) on bus arbitration.

An example of code signals used for communications through the communication bus 5 will be described hereinafter with reference to FIG. 2A.

Figure 2A:
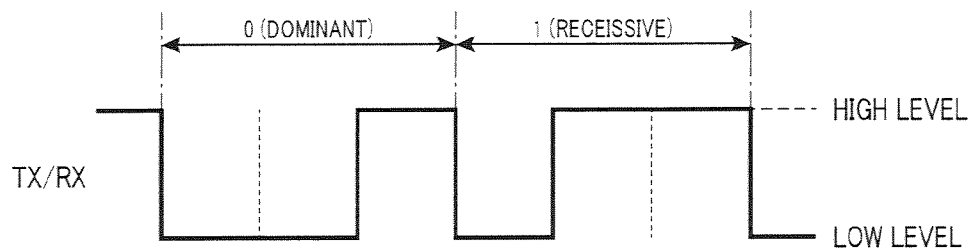
FIG. 2A is a view schematically illustrating an example of a code signal used in a communication bus illustrated in FIG. 3.

Referring to FIG. 2A, in the first embodiment, a PWM code signal is used as an example of code signals for communications through the communication bus 5. The PWM code signal consists of a set of first and second PWM codes; each of the first and second PWM codes corresponds to a bit of data to be transmitted through the communication bus 5. The first and second PWM codes have predetermined first and second duty cycles different from each other; each of the first and second duty cycles is the ratio of a duration of a low signal level to a total duration corresponding to a duration of each bit of data to be transmitted through the communication bus 5. That is, the first duty cycle of the first PWM code signifies a bit 0 of data, and the second duty cycle of the second PWM code signifies a bit 1 of data.

Specifically, a bit 0 of data to be transmitted through the communication bus 5 is expressed as the first PWM code consisting of a set of logical values "001". Similarly, a bit 1 of data to be transmitted through the communication bus 5 is expressed as the second PWM code consisting of a set of logical values "011". The logical value 0 corresponds to the low signal level on the communication bus 5, and the logical value 1 corresponds to the high signal level on the communication bus 5. That is, the first duty cycle is greater than the second duty cycle.

More specifically, the first one-third of a duration of a bit 0 of data to be transmitted through the communication bus 5 corresponds to a duration of a logical value 0 (the low signal level), the next one-third corresponds to a duration of a logical value 0, and the last one-third corresponds to a duration of a logical value 1 (the high signal level). Similarly, the first one-third of a duration of a bit 1 of data to be transmitted through the communication bus 5 corresponds to a duration of a logical value 0, the next one-third corresponds to a duration of a logical value 1, and the last one-third corresponds to a duration of a logical value 1.

Note that the first PWM code and second PWM code will be referred to as a dominant code (a dominant bit 0) and a recessive code (a recessive bit 1), respectively.

If the dominant code of a signal transmitted from a node 3 collides with the recessive code of another signal transmitted from an alternative node 3 on the communication bus 5, the dominant code wins on bus arbitration whereas the alternative node 3 loses thereon. For example, the communication system 1 according to this embodiment is configured based on CSMA/CA (Carrier Sense Multiple Access with Collision Avoidance). Thus, when grasping the result of bus arbitration based on the state of the communication bus 5, the alternative node stops transmission of the signal, so that the node 3 wining bus arbitration continuously transmits the signal.

Figure 2B:
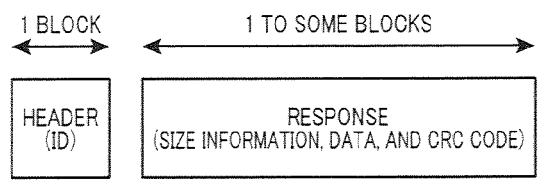
FIG. 2B is a view schematically illustrating an example of the structure of a frame communicable through the communication bus.

The nodes 3 according to this embodiment operate in accordance with a preselected master-slave protocol. In the master-slave protocol, one node 3 as a master node is designed to communicate with another node 3 as a slave node using frames each of which is a unit of data to be transmitted and received via the communication bus 5. FIG. 2B schematically illustrates the structure of a frame according to this embodiment.

As illustrated in FIG. 2B, a frame or a message frame is comprised of a header (H) for specifying data that a master node 3 allows to send, and a variable-length response including the data specified by the header. The header of a frame consists of an ID of data that the master node 3 allows to send. Such a frame is designed such that, the lower the value of the header is, the higher the possibility (probability) of the frame wining on bus arbitration is. The response of a frame at least includes corresponding data to be sent, information indicative of the size of the data (the size of the corresponding response), and a CRC (Cyclic Redundancy Check) code as an example of error detection codes for checking errors in the data. As a result, data is sent through the communication bus 5 as a frame (message frame) containing the set of a header and a response. One slot is allocated for one frame on the communication bus 5 and required for passing the one frame.

Note that an ID is a number allocated to data allowed to be sent for unique identification of the data.

Next, an example of the overall structure of each node 3, in other words, each of the master 3a and slave 3b will be described.

Each node 3 is designed to operate in either a wakeup mode or a sleep mode. The wakeup mode is an operation mode in which each node 3 can perform all functions (tasks) allocated to a corresponding node, and the sleep mode is an operation mode in which each node 3 cannot perform some functions (tasks) in order to reduce power consumption.

In the first embodiment, a body/wiper ECU in the nodes 3 serves as a master node (master) 3a, and the other nodes 3 serve as slave nodes (slaves) 3b.

In the master-slave protocol, the master 3a operates in a first communication mode (a regular communication mode) to successively send a header to successively designate pieces of data that corresponding slaves 3b are allowed to send, thus designating the corresponding slaves 3b as target slaves 3b requested to send the corresponding pieces of data. In other words, the master 3a performs polling of the slaves 3. Each of the target slaves 3b designated by the header operates in the first communication mode to send a response (data).

In the master-slave protocol, each slave 3b operates in a second communication mode (event communication mode) to actively send data independent of instructions from the master 3a.

Figure 3:
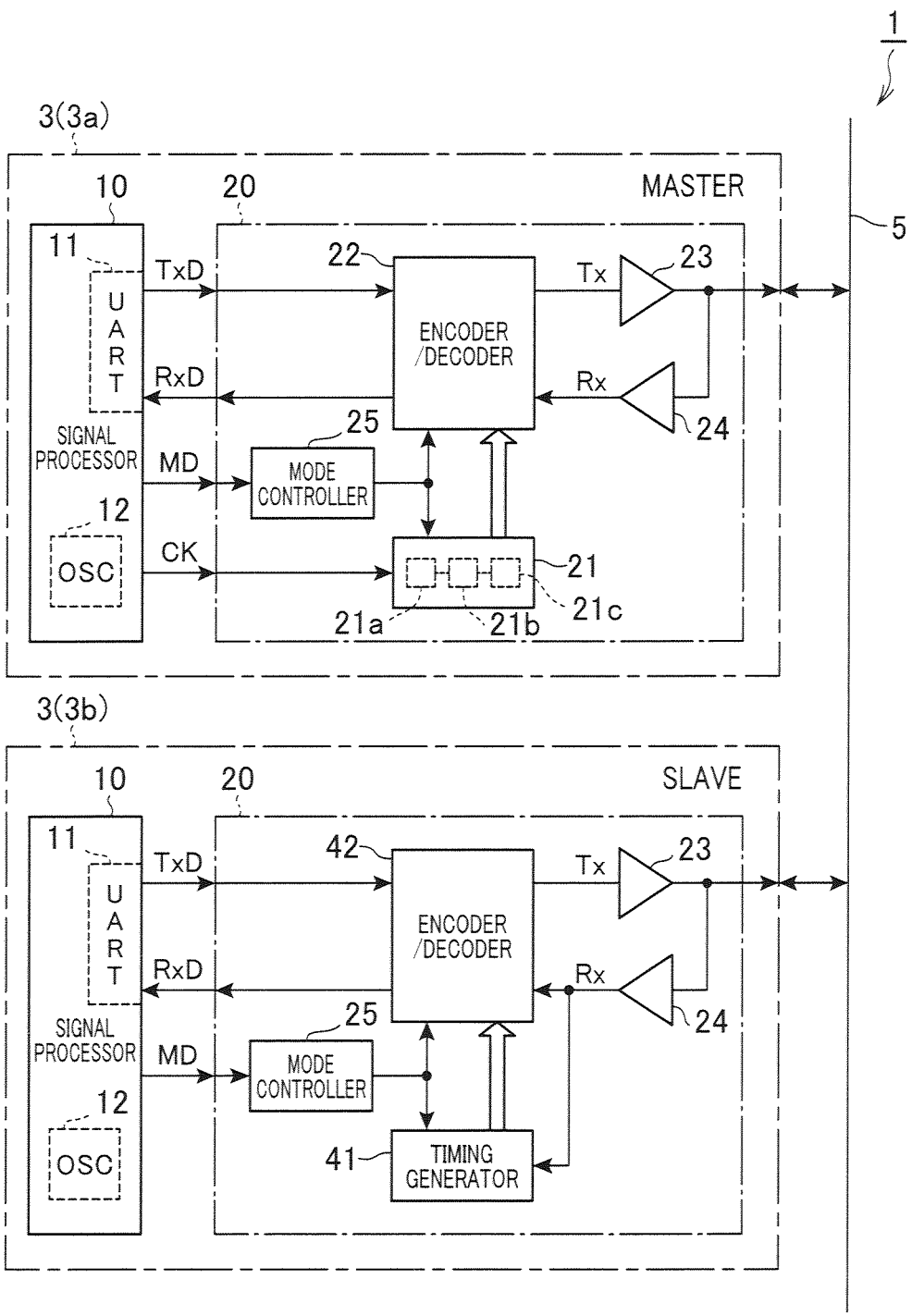
FIG. 3 is a block diagram schematically illustrating an example of the structure of a master node and each slave node constituting the communication system illustrated in FIG. 1.

Hereinafter, examples of the structure of the master 3a and that of each slave 3b will be described with reference to FIG. 3.

The master 3a is comprised of a signal processor 10 and a transceiver 20. The signal processor 10 is communicable with the transceiver 20, and configured to carry out tasks allocated thereto based on information; the information has been obtained by communications between the master 3a and other nodes 3 via the communication bus 5. The transceiver 20 is connected with the communication bus 5, and configured to: encode transmission data TXD based on an NRZ (Non-Return to Zero) code, which is supplied from the signal processor 10 with being asynchronous to the internal clock CK of the transceiver 20, into transmission data TX based on PWM code; and output the transmission data TX to the communication bus 5. In addition, the transceiver 20 is configured to receive data RX based on a PWM code from the communication bus 5; decode the received data RX into received data RXD based on NRZ code, and supply the decoded data RXD to the signal processor 10.

The signal processor 10 is designed as, for example, a normal microcomputer circuit consisting of, for example, a CPU, a storage medium including a nonvolatile memory, an IO (Input and output) interface, and so on. Particularly, the signal processor 10 is comprised of a UART (Universal Asynchronous Receiver Transmitter) 11 and an oscillator (OSC) 12.

The UART 11 is configured to carry out serial start-stop communications (serial asynchronous communications) at a predetermined data transfer rate (bit rate) of, for example, 20 Kbps. The UART 11 can be designed as a hardware circuit or a software module. The oscillator 12 is configured to generate an operation clock on which the signal processor 10 operates, and generate an internal clock CK with a predetermined rate substantially identical to the bit rate of the UART 11, thus supplying the internal clock CK to the transceiver 20.

In this embodiment, the oscillator 12 is designed using a quartz crystal oscillator, and therefore is capable of generating these clock signals with stable frequencies. The signal processor 10 is configured to operate in either the wakeup mode or sleep mode, and supply, to the transceiver 20, a mode signal MD indicative of the present operation mode of the corresponding node (master 3a).

Figure 2C:
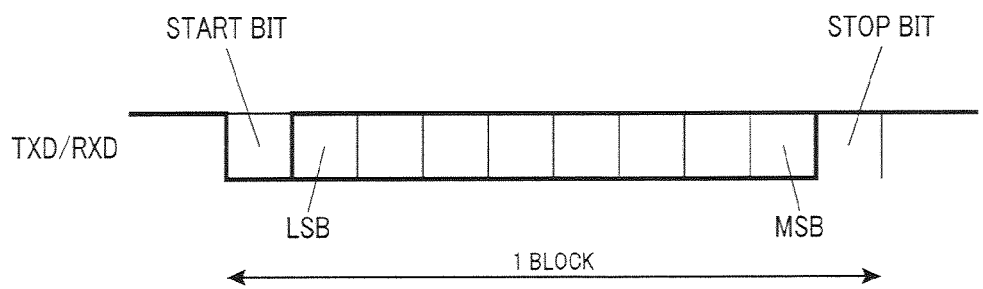
FIG. 2C is a view schematically illustrating block data communicable between an UART of a signal processor illustrated in FIG. 3 and a transceiver illustrated in FIG. 3.

FIG. 2C schematically illustrates an example of the structure of each of data TXD transmitted from the UART 11 and data RXD received thereby. Referring to FIG. 2C, each of data TXD from the UART 11 and data RXD to be received thereby is designed as a block data, so that data TXD or RXD is transmitted or received data-block by data-block. The block of data TXD or RXD consists of a start bit (0 bit) with the low signal level, a configurable number of data bits (8 bits in this embodiment), and one or more stop bits (one stop bit in this embodiment) with the high signal level. That is, each of data TXD and data RXD according to this embodiment is designed as 10-bit block data. Each of data TXD and RXD is configured such that: the least significant bit (LSB) is allocated to the first bit of the 8-bit data as the main part of corresponding data TXD or RXD, and the most significant bit (MSB) is allocated to the last bit thereof.

In this embodiment, the header of a frame set forth above is comprised of single block data, seven bits of the 8-bit data of each data TXD/RXD are set to an ID, and the remaining one bit of the 8-bit data is used as a parity bit. A response to be sent from a node 3 is comprised of a predetermined number of, such as one or more, pieces of block data. The size information can be stored in the first block in a response Returning to FIG. 3, the transceiver 20 is comprised of a timing generator 21, an encoder/decoder 22, a transmit buffer 23, a receive buffer 24, and a mode controller 25.

The timing generator 21 is equipped with a simple oscillator 21a comprised of a ring oscillator; the ring oscillator consists of a plurality of inverters connected in ring form. The simple oscillator 21a is configured to generate a counting clock CCK. The timing generator 21 is configured to divide the counting clock CCK to generate various timing signals each synchronized with the internal clock CK supplied from the signal processor 10.

The encoder/decoder 22 is configured to encode data (transmission data) TXD according to timing signals generated by the timing generator 21, and decode received data RXD according to timing signals generated by the timing generator 21.

The transmit buffer 23 is configured to transmit, to the communication bus 5, data encoded by the encoder/decoder 22 as encoded transmission data TX.

The receive buffer 24 is configured to capture data (signals) on the communication bus 5 as received data RX.

The mode controller 25 is configured to control operations of the timing generator 21 and the encoder/decoder 22 according to the mode signal MD supplied from the signal processor 10.

As described above, in order to perform bus arbitration on the communication bus 5, the structure of the communication bus 5 and the transmit buffer 23 can be constructed using, for example, a single wire, common open-collector circuits, and pull-up resistors. For example, the receive buffer 24 is designed as a common comparator, and configured to output the high signal level if the level on the communication bus 5 is higher than a preset threshold level, and the low signal level if the level on the communication bus 5 is lower than the preset threshold level.

The mode controller 25 is configured to output a control signal to each of the timing generator 21 and the encoder/decoder 22 to enable each of the timing generator 21 and the encoder/decoder 22 if the mode signal MD represents the wakeup mode, and to disable the timing generator 21 from generating the timing signals if the mode signal MD represents the sleep mode.

Figure 4:
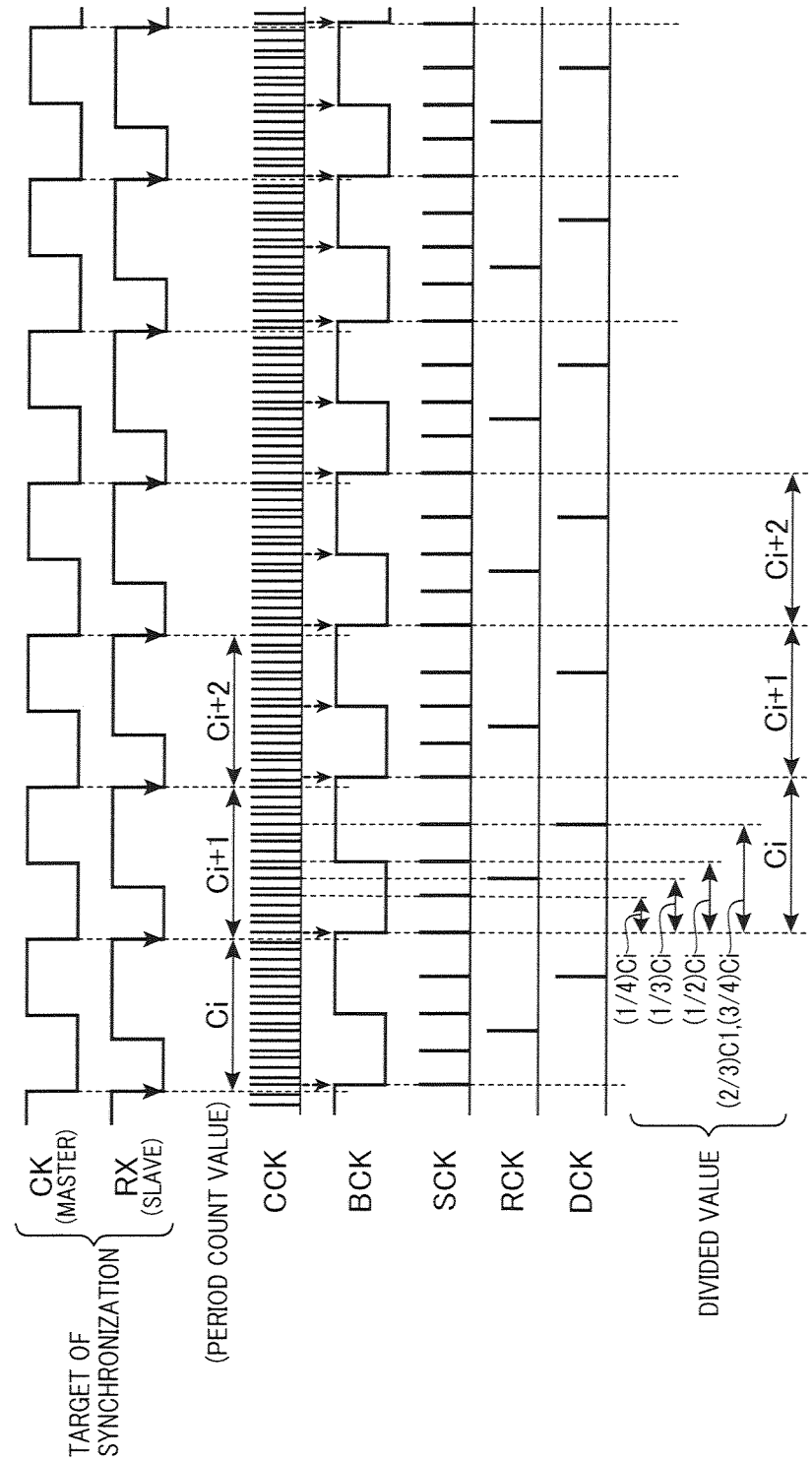
FIG. 4 is a timing chart schematically illustrating various timing signals generated by a timing generator illustrated in FIG. 3.

FIG. 4 is a timing chart schematically illustrating various timing signals generated by the timing generator 21. In this embodiment, the counting clock CCK is sufficiently higher in frequency than the internal clock CK.

For example, the timing generator 21 is comprised of a counter 21b and a divider 21c in addition to the oscillator 21a. The counter 21b is configured to measure the lengths of intervals of adjacent failing edges (high-to-low transition edges) of the internal clock CK, that is, the length of each cycle of the internal clock CK according to the counting clock CCK generated by the oscillator 21a. The divider 21c is configured to divide a period count value $C_i$ of the counter 21b representing the length of each i-th cycle of the internal clock CK ($i=1, 2, \ldots$), that is, the period of the internal clock CK, thus generating various timing signals that are synchronized with the internal clock CK.

Specifically, the counter 21b starts to count up the period count value $C_i$ from an initial value of, for example, 0 in response to a pulse of the counting clock CCK substantially synchronized with the falling edge of each i-th cycle of the internal clock CK, and stops the count-up of the period count value $C_i$ and resets the period count value $C_i$ to the initial value in response to a pulse of the counting clock CCK substantially synchronized with the riding edge (low-to-high transition edge) of a corresponding i-th cycle of the internal clock CK.

The divider 21c divides the period count value Ci of the counter 21b at the stop of the count-up immediately before the reset of the period count value Ci for each i-th cycle of the internal clock CK, thus generating various timing signals synchronized with the internal clock CK.

In this embodiment, the timing generator 21 generates various clocks as the various timing signals described hereinafter; each of the various clocks has a period that is an integer submultiple of the period of the internal clock CK. In other words, the divider 21c serves as a frequency multiplier that generates each of the various clocks having the number of rising or falling edges per cycle of the internal clock CK.

Referring to FIG. 4, the timing generator 21 generates a bus clock BCK, a sampling clock SCK, a recessive-generating clock RCK, and a dominant-generating clock DCK. Each clock is a signal consisting of periodic (cyclic) pulses (pulse-like waves).

The bus clock BCK has a period that corresponds to the duration of a bit (a recessive or dominant bit) of a signal communicated through the communication bus 5.

Specifically, the timing generator 21 generates the bus clock BCK such that the length of an interval between each pair of adjacent falling and rising edges of the bus clock BCK for an (i+1) cycle of the bus clock BCK is set to the half of the period count value Ci of the counter 21b for the i-th cycle of the internal clock CK; the period count value Ci represents the length of the i-th cycle of the internal clock CK. Thus, the bus clock BCK has a 50% duty cycle corresponding to the half of the repletion period of the internal clock CK.

More specifically, the timing generator 21 generates the bus clock BCK such that the falling edge of each cycle of the bus clock BCK is substantially synchronized with the falling edge of a corresponding cycle of the internal clock CK, and the interval between the falling edge of each cycle of the bus clock BCK and the rising edge of a corresponding cycle thereof is set to the half of the corresponding cycle of the internal clock CK.

For example, referring to FIG. 4, the timing generator 21 generates the falling edge of an (i+1)-th cycle of the bus clock BCK substantially synchronized with the falling edge of an i-th cycle of the internal clock CK, and generates the rising edge of the (i+1)-th cycle of the bus clock BCK such that the interval between the falling edge and the rising edge of the (i+1)-th cycle of the bus clock BCK is in agreement with the half (½) of the period count value Ci of the counter 21b for the i-th cycle of the internal clock CK.

The timing generator 21 also generates the sampling clock SCK such that the rising edge of one cycle of the sampling clock SCK is substantially synchronized with the falling edge of a corresponding cycle of the bus clock BCK that corresponds to the falling edge of a corresponding cycle of the internal clock CK, and the length of an interval between each pair of adjacent rising edges of the sampling clock SCK, that is, the length of each cycle of the sampling clock SCK, is set to the quarter of the period count value Ci of the counter 21b for the i-th cycle of the internal clock CK; the period count value Ci represents the length of the i-th cycle of the internal clock CK. Thus, the sampling clock SCK has a 25% duty cycle corresponding to a quarter (¼) of the period of the internal clock CK.

In other words, the sampling clock SCK has four rising edges per cycle of the bus clock BCK (internal clock CK).

For example, referring to FIG. 4, the timing generator 21 generates the sampling clock SCK such that:

the rising edge of a first cycle of the sampling clock SCK is substantially synchronized with the falling edge of a corresponding (i+1)-th cycle of the bus clock BCK that corresponds to the falling edge of a corresponding (i+1)-th cycle of the internal clock CK;

an interval between the rising edge of the first cycle and the rising edge of the next second cycle of the sampling clock SCK is in agreement with a ¼ of the period count value Ci of the counter 21b for the i-th cycle of the internal clock CK;

an interval between the rising edge of the second cycle and the rising edge of the next third cycle of the sampling clock SCK is in agreement with a 2/4 of the period count value Ci of the counter 21b for the i-th cycle of the internal clock CK; and an interval between the rising edge of the third cycle and the rising edge of the next fourth cycle of the sampling clock SCK is in agreement with a ¾ of the period count value Ci of the counter 21b for the i-th cycle of the internal clock CK.

The timing generator 21 also generates the recessive-generating clock RCK such that the rising edge of each cycle of the recessive-generating clock RCK occurs at the timing when a ⅓ of the length of the period of the internal clock CK has elapsed since the falling edge of a corresponding cycle of the bus clock BCK.

For example, referring to FIG. 4, the timing generator 21 generates the recessive-generating clock RCK such that the rising edge of (i+1)-th cycle of the recessive-generating clock RCK occurs at the timing when a ⅓ of the period count value Ci of the counter 21b for the i-th cycle of the internal clock CK has elapsed since the falling edge of the (i+1)-th cycle of the bus clock BCK.

The timing generator 21 also generates the dominant-generating clock DCK such that the rising edge of each cycle of the dominant-generating clock DCK occurs at the timing when a ⅔ of the length of the period of the internal clock CK has elapsed since the falling edge of a corresponding cycle of the bus clock BCK.

For example, referring to FIG. 4, the timing generator 21 generates the dominant-generating clock DCK such that the rising edge of (i+1)-th cycle of the dominant-generating clock DCK occurs at the timing when a ⅔ of the period count value Ci of the counter 21b for the i-th cycle of the internal clock CK has elapsed since the falling edge of the (i+1)-th cycle of the bus clock BCK.

Note that the timing generator 21 is configured to activate the oscillator 21a to generate the counting clock CCK in accordance with instructions supplied from the mode controller 25 if the operation mode of the corresponding node (master 3a) is the wakeup mode, and disable the timing generator 21 if the mode signal MD represents the sleep mode.

Next, an example of the structure of the encoder/decoder 22 of the transceiver 20 will be described hereinafter with reference to FIG. 5.

Figure 5:
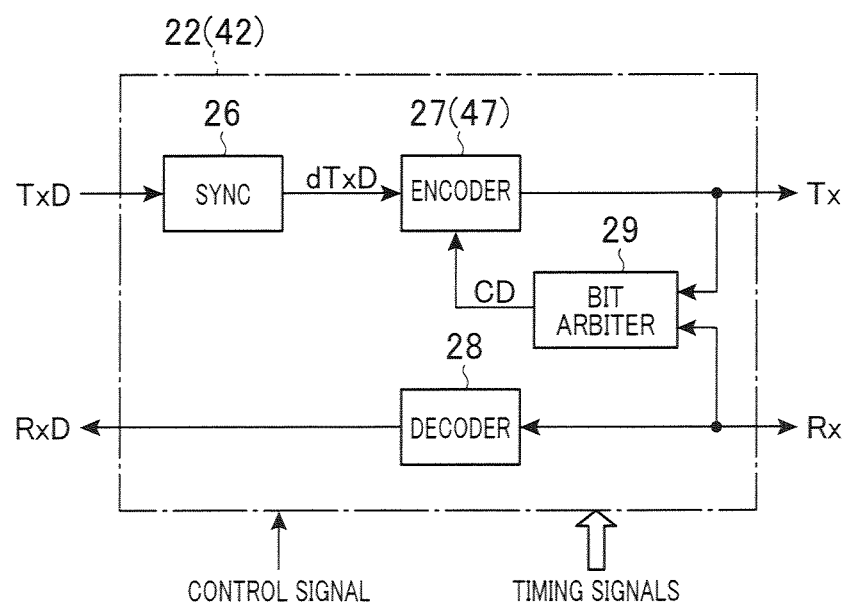
FIG. 5 is a block diagram schematically illustrating an example of the structure of an encoder/decoder illustrated in FIG. 3.

Referring to FIG. 5, the encoder/decoder 22 is comprised of a synchronizing circuit (SYNC) 26, an encoder 27, a decoder 28, and a bit arbiter 29.

The synchronizing circuit 26 is configured to synchronize NRZ-coded transmission data TXD, which is supplied from the signal processor 10, with the bus clock BCK generated by the timing generator 21, thus generating synchronized transmission data dTXD.

The encoder 27 is configured to encode the synchronized transmission data dTXD outputted from the synchronizing circuit 26 into PWM-coded transmission data TX, and supply the encoded transmission data TX to the transmit buffer 23.

The decoder 28 is configured to decode PWM-coded data RX received via the receive buffer 24 into NRZ-coded received data RXD, and supply the decoded received data RXD to the signal processor 10.

The bit arbiter 29 is configured to compare transmission data TX encoded by the encoder 27 with received data RX received by the receive buffer 24 bit-by-bit (code-by-code), and output a collision detection signal CD to the encoder 27 if, on the communication bus 5, the signal level of the first or second code of the transmission data TX is in agreement with that of the first or second code of the received data RX based on results of the comparison.

For example, the bit arbiter 29 according to this embodiment is comprised of an XOR gate. The arbiter 29 is configured to sample the signal level of each of the transmission data TX and the received data RX at the timing synchronized with the rising edge of each cycle of the bus clock BCK, and compare the sampled signal level of the transmission data TX with that of the received data RX using the XOR gate, thus outputting an active level (high or low level) or inactive level (the reverse level of the active level) of the collision detection signal CD as the output of the XOR gate.

Specifically, the arbiter 29 compares the sampled signal level of the transmission data TX generated by the corresponding node (master 3a) with that of the received data RX outputted from an alternative node, and outputs the active level of the collision signal CD if the sampled signal level of the transmission data TX is the second code (recessive code) and the sampled signal level of the received data RX is the dominant code so that the corresponding node (master 3a) loses on bus arbitration. On the other hand, the arbiter 29 outputs the inactive level of the collision signal CD if the sampled signal level of the transmission data TX is not the second code (recessive code) so that the corresponding node (master 3a) does not lose on bus arbitration.

FIG. 6A is a timing chart schematically illustrating operations of the encoder 27 of the master 3a.

Referring to FIG. 6A, if the sampled signal level (sampled bit) of the synchronized transmission data dTXD shows the low signal level (0 bit) (see the first cycle as an example), the encoder 27 generates, using the bus clock BCK (particularly, a corresponding falling edge) and the dominant-generating clock DCK, the dominant code of encoded transmission data TX such that ⅔ of the duration of the 0 bit of the synchronized transmission data dTXD is the low signal level, and the remaining ⅓ of the duration of the 0 bit is the high signal level.

On the other hand, if the sampled signal level (sampled bit) of the synchronized transmission data dTXD shows the high signal level (1 bit) (see the second cycle as an example), the encoder 27 generates, using the bus clock BCK (particularly, a corresponding falling edge) and the recessive-generating clock RCK, the second code (recessive code) of encoded transmission data TX such that ⅓ of the duration of the 1 bit of the synchronized transmission data dTXD is the low signal level, and the remaining ⅔ of the duration of the 1 bit is the high signal level.

Note that, if no transmission data TXD are supplied from the signal processor 10, the input of the synchronizing circuit 26, and therefore the input of the encoder 27 are kept high level, so that the second bit (recessive bit) is constantly supplied from the encoder 27 to the communication bus 5 via the transmit buffer 23.

Hereinafter, a period within which a predetermined number of bits corresponding to the second codes (recessive codes) are continued on the communication bus 5 will be referred to as IFS (Inter Frame State), and if the IFS is detected as the current state of the communication bus 5, the communication bus 5 is in an idle state.

If the collision detection signal CD changes from the inactive level to the active level, the encoder 27 is configured to forcibly output the second code (recessive code) until the signal processing of block data including corresponding synchronized-transmission data dTXD is completed independently of the signal level of the synchronized-transmission data dTXD.

The decoder 28 is configured to sample received data RX at the falling edge of each cycle of the bus clock BCK, and output the sampled results as decoded received data RXD.

Next, an example of the structure of the synchronizing circuit 26 will be described hereinafter with reference to FIG. 7.

Figure 7:
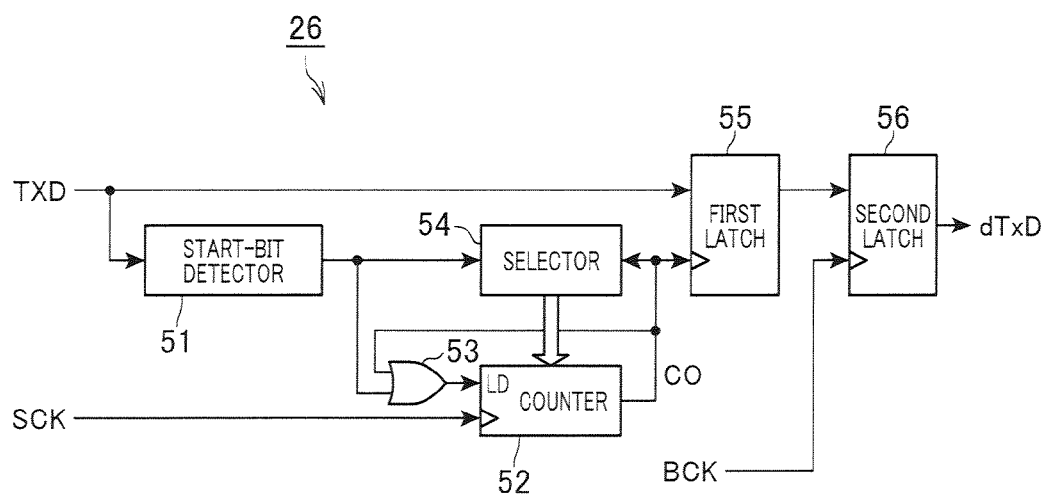
FIG. 7 is a block diagram schematically illustrating an example of the structure of a synchronizing circuit illustrated in FIG. 5.

Referring to FIG. 7, the synchronizing circuit 26 is comprised of a start-bit detector 51, a down counter 52, an OR gate 53, a count-value selector 54, a first latch 55, and a second latch 56.

The start-bit detector 51 is configured to detect the falling edge (start edge) of the start bit of transmission data TXD supplied from the signal processor 10. The down counter 52 is configured to decrement a count value loaded from the count-value selector 54 by 1 each time a rising edge of the sampling clock SCK occurs.

The OR gate 53 is configured to generate a signal for loading a count value to the down counter 52 at the first timing of the start edge of the start bit or the second timing when the down counter 52 has counted out (i.e. the loaded count value has reached zero); the first timing will be referred to as "start timing", and the second timing will be referred to as "CO timing".

The count-value selector 54 is configured to select one of prepared count values according to the start timing and the CO timing as the count value to be loaded to the down counter 52. The first latch 55 is configured to latch a signal level of transmission data TXD supplied from the signal processor 10 at the CO timing. The second latch 56 is configured to latch the output of the first latch 55 each time a falling edge of the bus clock BCK occurs. The synchronizing circuit 26 is configured to output, as synchronized transmission data dTXD, the output of the second latch 56.

In this embodiment, as the prepared count values, 2 and 4 are used. That is, the count-value selector 54 is configured to select, as the count value loaded to the down counter 52:

the count value 2 to be loaded to the down counter 52 before the occurrence of the first CO timing after the occurrence of the start timing;

the count value 4 to be loaded to the down counter 52 after the occurrence of the first CO timing; and the count value 2 to be loaded to the down counter 52 after ten CO timings corresponding to the number of bits (10 bits) of the block of transmission data TXD have occurred, in other words, the tenth CO timing occurs.

Specifically, as illustrated in each of FIGS. 8A and 8B, when the start edge of the start bit of transmission data TXD supplied from the signal processor 10 is detected by the start-bit detector 51 at time t1, the first latch 55 samples (latches) a signal level (a bit) of the transmission data TXD at time t2 when the second rising edge of the sampling clock SCK occurs after the time t1, so that the output of the first latch 55 is held at the sampled data of the transmission data TXD at the time t2.

Thereafter, the first latch 55 samples (latches) a signal level (a bit) of the transmission data TXD each time ($t3a1$, $t3a2$, ..., $t3a9$) the fourth rising edge of the sampling clock SCK appears after the corresponding latching (sampling), so that the output of the first latch 55 is held at the sampled data of the transmission data TXD at each time (t3a1, t3a2, ..., t3a9).

At that time, the second latch 56 samples (latches) the output of the first latch 55 at each falling edge of the bus clock BCK, thus generating synchronized transmission data dTXD synchronized with the bus clock BCK.

That is, the first latch 55 samples (latches), after the occurrence of the start timing, a signal level of the transmission data TXD each time a (4×k+2)-th rising edge of the sampling clock SCK (k=0, 1, 2, ..., 9) appears, so that the output of the first latch 55 is held at the sampled data of the transmission data TXD at each sampling timing. Then, the second latch 56 samples (latches) the output of the first latch 55 at each falling edge of the bus clock BCK, thus generating synchronized transmission data dTXD synchronized with the bus clock BCK.

Note that FIGS. 8A and 8B are timing charts each showing operations of the synchronizing circuit 26. FIG. 8A illustrates a first example of operations of the synchronizing circuit 26 if the start timing of transmission data TXD occurs immediately after a rising edge of the sampling clock SCK, and FIG. 8B illustrates a second example of operations of the synchronizing circuit 26 if a rising edge of the sampling clock SCK occurs immediately after the start timing of transmission data TXD.

In each of the first and second examples, at the sampling time of the start bit of transmission data TXD, an interval is ensured between a transition of the transmission data TXD from 0 to 1 or 1 to 0 and the sampling timing of a corresponding bit of the transmission data TXD by a corresponding riding edge of the sampling clock SCK; the interval has a length equal to or longer than the quarter of the duration (width) of a corresponding bit of the transmission data TXD. That is, as illustrated in FIG. 8B, even if a rising edge of the sampling clock SCK appears immediately after the start timing of transmission data TXD, the interval having a length equal to or longer than the quarter of the duration (width) of a corresponding bit of the transmission data TXD can be ensured.

As described above, the transceiver 20 of the master 3a is designed to perform, in the wakeup mode as its operation mode, continuous output of the second code (recessive code) to the communication bus 5 even if no transmission data TXD is supplied thereto from the signal processor 10 in addition to encoding of transmission data TXD supplied from the signal processor 10 and decoding of received data RXD from the communication bus 5. This allows the transceiver 20 to serve as a clock master to supply clock information of the internal clock CK to another node 3 other than the master 3a.

Returning to FIG. 3, each slave 3b is comprised of a signal processor 30 and a transceiver 40 in a similar manner to the master 3a. The signal processor 30 is communicable with the transceiver 40, and configured to carry out tasks allocated thereto based on information obtained by communications between the corresponding slave 3b and other nodes 3 via the communication bus 5. The transceiver 40 is connected with the communication bus 5, and configured to: encode transmission data TXD based on NRZ code, which is supplied from the signal processor 30, into transmission data TX based on PWM code; and output the transmission data TX to the communication bus 5. In addition, the transceiver 40 is configured to receive data RX based on PWM code from the communication bus 5; decode the received data RX into received data RXD based on NRZ code, and supply the decoded data RXD to the signal processor 30.

The signal processor 30 has the same structure as the signal processor 10 except that a function to supply the internal clock CK to the transceiver 40 is omitted.

Note that the signal processor 30 need not be configured as a microcomputer circuit. Specifically, the signal processor 30 can be composed of a sequencer that serves as the UART 11, and an oscillator for generating an operation clock on which the sequencer operates.

The transceiver 40 is comprised of a timing generator 41, an encoder/decoder 42, a transmit buffer 43, a receive buffer 44, and a mode controller 45 as well as the transceiver 10 is. A part of the timing generator 41 is different from the timing generator 21, and a part of the encoder/decoder 42 is different from the encoder/decoder 22, so that these different points will be mainly described hereinafter.

Specifically, the different point of the timing generator 41 from the timing generator 21 is that the timing generator 41 is configured to generate various timing signals each synchronized with received data RX different from the internal clock CK; the received data RX is captured via the receive buffer 24 from the communication bus 5 in the same approach using the internal clock CK by the timing generator 21 (see FIG. 4).

That is, the timing generator 41 is configured to sample falling 1.5 edges of received data RX captured from the communication bus 5; these falling edges are boundaries of adjacent dominant and/or recessive codes, i.e. adjacent dominant and/or recessive bits, of the received data RX as clock information. Then, the timing generator 41 is configured to generate the bus clock BCK with falling edges synchronized with the clock information (the sampled falling edges) of the received data RX, thus encoding transmission data TXD supplied from the signal processor 30 based on the bus clock BCK, and decoding the received data RX based on the bus clock BCK. This establishes communications among the nodes 3 through the communication bus 5.

As described above, the synchronizing circuit 26 of the transceiver 20 or 40 of each node 3 in the communication system 1 is configured to sample (latch), after the occurrence of the start timing, a signal level of transmission data TXD supplied from the signal processor 10 or 30 each time a (4×k+2)-th rising edge of the sampling clock SCK (k= 0, 1, 2, ..., 9) occurs. Then, the synchronizing circuit 26 is configured to sample (latch) a latched signal level at each falling edge of the bus clock BCK, thus generating synchronized transmission data dTXD synchronized with the bus clock BCK. The encoder 27 or 47 of the transceiver 20 or 40 of each node 3 is configured to encode the synchronized transmission data dTXD generated by the synchronizing circuit 26.

The configuration of the synchronizing circuit 26 ensures, between a transition of the transmission data TXD from 0 to 1 or 1 to 0 and the sampling timing of a corresponding bit of the transmission data TXD by a corresponding rising edge of the sampling clock SCK, an interval that has, even in the worst case, a length equal to the quarter of the duration (width) of a corresponding bit of the transmission data TXD. Therefore, it is possible to properly sample signal levels (bits) of transmission data TXD, thus reducing misrecognition of signal levels (bits) of the transmission data TXD.

Note that the synchronizing circuit 26 of the transceiver 20 or 40 of each node 3 is configured to sample (latch), after the occurrence of the start timing, a signal level of transmission data TXD supplied from the signal processor 10 or 30 each time a (4×k+2)-th rising edge of the sampling clock SCK (k=0, 1, 2, ..., 9) appears, but can be configured to sample (latch), after the occurrence of the start timing, a signal level of transmission data TXD supplied from the signal processor 10 or 30 each time a (4×k+3)-th rising edge of the sampling clock SCK (k=0, 1, 2, . . . , 9) occurs.

In addition, note that the sampling (latching) timing of transmission data TXD, that is, the occurrence of a (4×k+2)-th rising edge of the sampling clock SCK (k=0, 1, 2, . . . , 9), is determined depending on the fact that the sampling clock SCK has four rising edges per cycle of the bus clock BCK.

Generally sparking, if the sampling clock SCK has N rising or falling edges (N is an integer equal to or greater than 3) per cycle of the bus clock BCK, the synchronizing circuit 26 of the transceiver 20 or 40 of each node 3 can be configured to sample (latch), after the occurrence of the start timing, a signal level of transmission data TXD supplied from the signal processor 10 or 30 each time a (P+k·N)-th rising edge of the sampling clock SCK appears (k=0, 1, 2, . . . , 9) where P is (N+1)/2 when the N is an odd number, or P is (N+2)/2 when the N is an even number. That is, the k is determined based on the size (length) of the block of transmission data TXD.

In the first embodiment, each of the timing generators 21 and 41 serves as an example of a clock generator of the first exemplary aspect of the present disclosure, and first circuitry comprised of the start-bit detector 51, the counter 52, and the selector 54 of the synchronizing circuit 26 serves as an example of a sampling timing generator of the first exemplary aspect of the present disclosure. Second circuitry comprised of the first and second latches 55 and 56 serves as an example of a sampling module of the first exemplary aspect of the present disclosure, and the encoder 27 serves as an example of a transmitter of the first exemplary aspect of the present disclosure. In addition, the counter 52 serves as a generating module of the sampling timing generator of the first exemplary aspect of the present disclosure.

Second Embodiment

A communication system according to a second embodiment of the present disclosure will be described with reference to FIGS. 9 and 10.

The structure and/or functions of the control system according to the second embodiment are different from the communication system 1 by the following points. So, the different points will be mainly described hereinafter.

Each of the encoder/decoders 22 and 42 is comprised of a synchronizing circuit 26a whose structure is different from that of the synchronizing circuit 26 according to the first embodiment. That is, the synchronizing circuit 26a of the transceiver 20 of the master 3a is identical in structure to the synchronizing circuit 26 of the transceiver 40 of each slave 3b.

Figure 9:
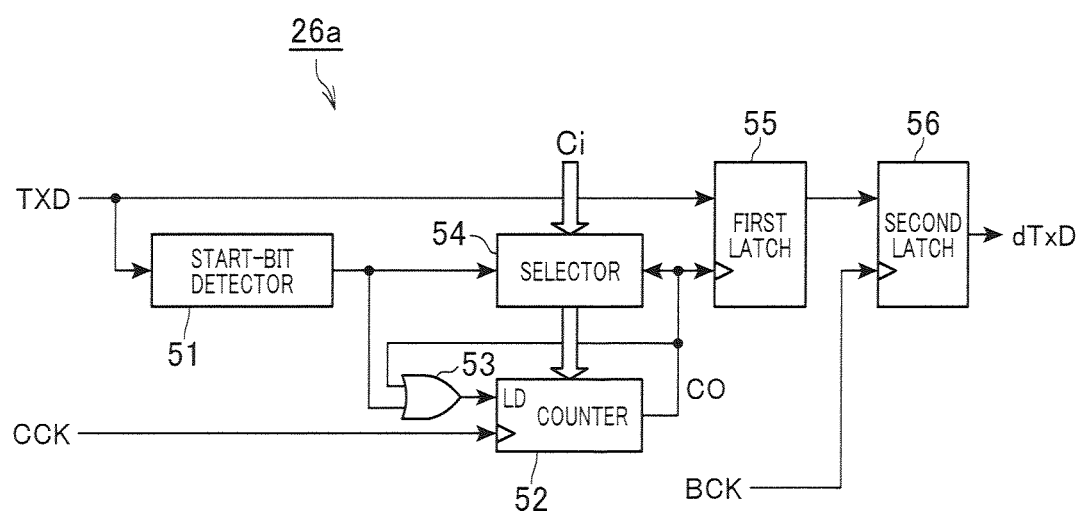
FIG. 9 is a block diagram schematically illustrating an example of the structure of a synchronizing circuit according to a second embodiment of the present disclosure.

Referring to FIG. 9, the synchronizing circuit 26a is comprised of the start-bit detector 51, a down counter 52a, the OR gate 53, a count-value selector 54a, the first latch 55, and the second latch 56 as well as the synchronizing circuit 26. The structures and operations of the start-bit detector 51, OR gate 53, first latch 55, and second latch 56 are substantially identical to those of the components 51, 53, 55, and 56 of the synchronizing circuit 26.

The down counter 52a is configured to decrement a count value loaded from the count-value selector 54a by 1 each time a rising edge of the counting clock CCK occurs.

The count-value selector 54a is configured to receive the period count value Ci of the counter 21b for each i-th cycle of the internal clock CK, and select, as the count value loaded to the down counter 52a:

"Ci/2", which is the half of the period count value Ci, to be loaded to the down counter 52a before the occurrence of the first CO timing after the occurrence of the start timing;

the period count value Ci to be loaded to the down counter 52a after the occurrence of the first CO timing; and "Ci/2", which is the half of the period count value Ci, to be loaded to the down counter 52a after ten CO timings corresponding to the number of bits (10 bits) of the block of transmission data TXD have appeared, in other words, the tenth CO timing appears.

Figure 10:
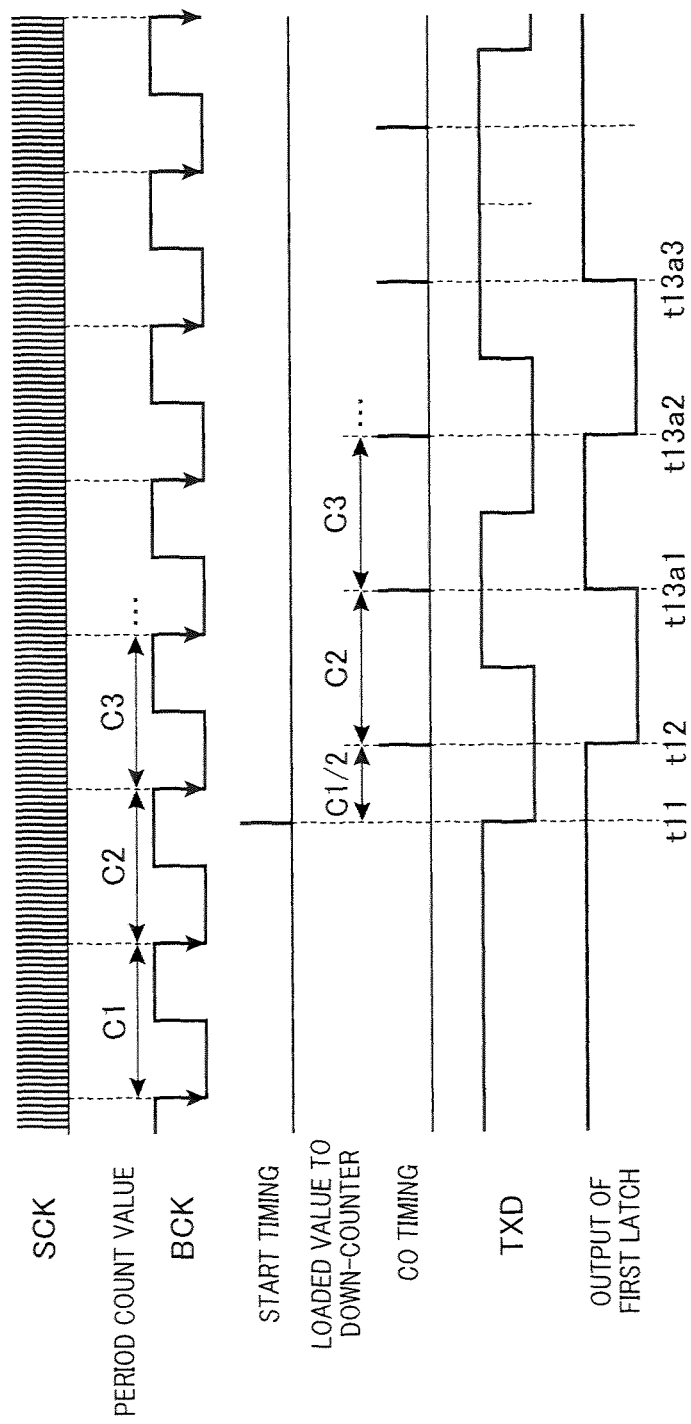
FIG. 10 is a timing chart schematically illustrating an example of operations of the synchronizing circuit illustrated in FIG. 9.

Specifically, as illustrated in FIG. 10, when the start edge of the start bit of transmission data TXD supplied from the signal processor 10 is detected by the start-bit detector 51 at time t11, the first latch 55 samples (latches) a signal level (a bit) of the transmission data TXD at time t12 when the count value "C1/2 (i=1)" has counted out by the down counter 52a, so that the output of the first latch 55 is held at the sampled data of the transmission data TXD at the time t12.

Thereafter, the first latch 55 samples (latches) a signal level (a bit) of o the transmission data TXD each time (t13a1, t13a2, t13a9) a count value (C2, C3, . . . , C9) has counted out by the down counter 52a since the corresponding latching (sampling), so that the output of the first latch 55 is held at the sampled data of the transmission data TXD at each time (t13a1, t13a2, t13a9).

At that time, the second latch 56 samples (latches) the output of the first latch 55 at each falling edge of the bus clock BCK, thus generating synchronized transmission data dTXD synchronized with the bus clock BCK.

That is, the first latch 55 samples (latches), after the occurrence of the start timing, a signal level of transmission data TXD each time a count value (Ci/2+k×Ci) has counted out by the down counter 52a since the corresponding latching (sampling) (k=0, 1, 2, . . . , 9), so that the output of the first latch 55 is held at the sampled data of the transmission data TXD at each sampling timing. Then, the second latch 56 samples (latches) the output of the first latch 55 at each falling edge of the bus clock BCK, thus generating synchronized transmission data dTXD synchronized with the bus clock BCK.

With the configuration of the synchronizing circuit 26a, because the period count value Ci of the counter 21b represents the period of the internal clock CK, that is, the bus clock BCK, it is possible to determine the sampling timing (sampling position) of each bit of transmission data TXD at the middle or its vicinity of the duration of a corresponding bit thereof. Thus, it is possible to more properly sample signal levels (bits) of transmission data TXD, thus further reducing misrecognition of signal levels (bits) of the transmission data TXD.

In addition, the configuration of the synchronizing circuit 26a makes it possible to increase an allowable range of the difference between the period of the bus clock BCK and the duration of each bit of transmission data TXD with respect to the difference therebetween for the synchronizing circuit 26. This increases an allowable variation range in the sampling timings for the respective bits of transmission data TXD due to the difference, thus facilitating the design and manufacture of the transceivers 20 and 40.

Note that, in this embodiment, a period count value of the counter 2b obtained for each cycle of the bus clock BCK can be used as the period count value Ci, a simple average of the count values for respective cycles of the bus clock BCK, or a moving average of the count values for respective cycles thereof can be used as the periodic count value Ci of the counter 2b.

In the second embodiment, the counter 21b of each of the timing generators 21 and 41 serves as an example of a counter of a sampling timing generator of the second structural type of the first exemplary aspect of the present disclosure, and the counter 52 serves as an example of a generating module of the sampling timing generator of the second structural type of the first exemplary aspect of the present disclosure.

Third Embodiment

A communication system according to a third embodiment of the present disclosure will be described with reference to FIGS. 11 and 12.

The structure and/or functions of the control system according to the third embodiment are different from the communication system 1 by the following points. So, the different points will be mainly described hereinafter.

Each of the encoder/decoders 22 and 42 is comprised of a synchronizing circuit 26b whose structure is different from that of the synchronizing circuit 26 according to the first embodiment. That is, the synchronizing circuit 26b of the transceiver 20 of the master 3a is identical in structure to the synchronizing circuit 26 of the transceiver 40 of each slave 3b.

Figure 11:
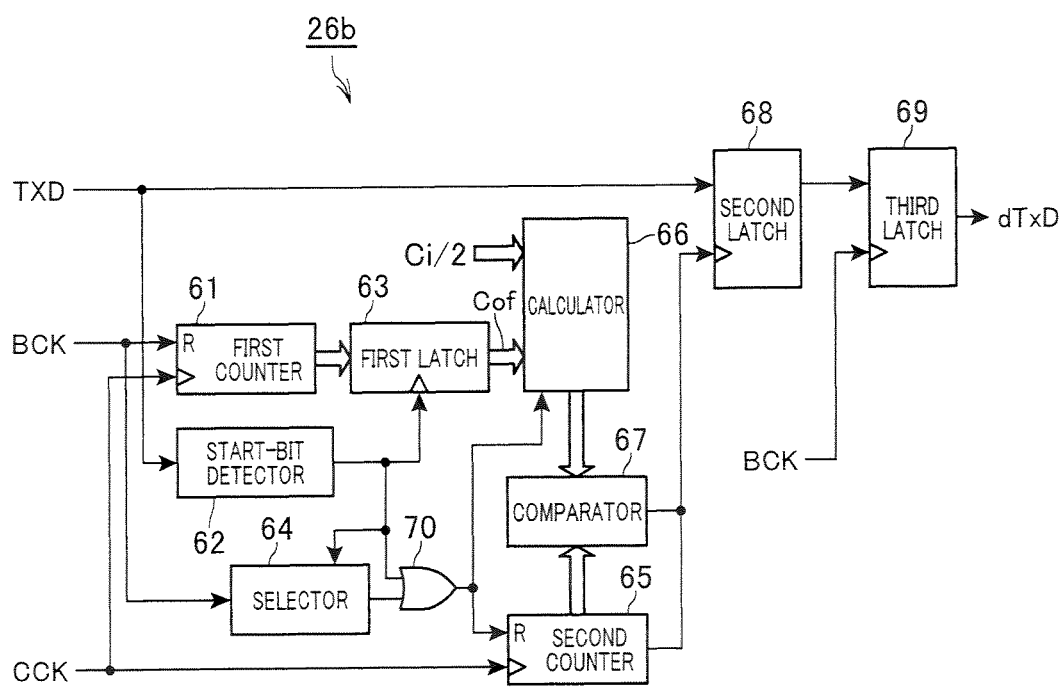
FIG. 11 is a block diagram schematically illustrating an example of the structure of a synchronizing circuit according to a third embodiment of the present disclosure.

Referring to FIG. 11, the synchronizing circuit 26c is comprised of a first counter 61, a start-bit detector 62, a first latch 63, an edge selector 64, a second counter 65, a calculator 66, a comparator 67, a second latch 68, and a third latch 69.

The first counter 61 is configured to count up a count value each time a rising edge or a falling edge of the counting clock CCK appears, and reset the count value each time each of a rising edge and a falling edge of the bus clock BCK appears.

The start-bit detector 62 is configured to detect the falling edge (start edge) of the start bit of transmission data TXD supplied from the signal processor 10. The first latch 63 is configured to latch a count value of the first counter 61 at the timing (start timing) of the start edge detected by the start-bit detector 62.

The edge selector 64 is configured to select a rising edge or a falling edge of the bus clock BCK as a target edge; the type (rising edge or falling edge) of the target edge is matched with the type of an edge occurring immediately before the start timing.

The second counter 65 is configured to count up a count value each time a rising edge or a falling edge of the counting clock CCK appears.

The OR gate 70 is configured to generate a reset signal for resetting the count value of the second counter 65 at each of the timing of the target edge selected by the edge selector 64 and the start timing.

The calculator 66 is configured to select, in response to the output of the OR gate 70, one of: half of a period count value of the counter 21b ($C_i/2$) generated by the timing generator 21 or 41; and a value "$C_{of}+C_i/2$" generated by adding the $C_i/2$ to a count value $C_{of}$ of the counter 61 latched by the first latch 63. The value $C_i/2$ will be referred to as a "half-period count value", and the count value $C_{of}$ will be referred to as an "offset value".

The calculator 66 is also configured to output the selected one of the half-period count value $C_i/2$ and the offset value $C_{of}$ as a comparison value.

The comparator 67 is configured to compare a count value of the counter 65 with the comparison value, and output a signal when determining that a count value of the counter 65 is in agreement with the comparison value.

The second latch 68 is configured to latch a signal level (a bit) of transmission data TX supplied from the signal processor 10 at the timing when it is determined by the comparator 67 that a count value of the counter 65 is in agreement with the comparison value, so that the output of the second latch 68 is held at the sampled data of the transmission data TXD.

The third latch 69 is configured to sample (latch) the output of the second latch 68 at each falling edge of the bus clock BCK, thus generating synchronized transmission data dTXD synchronized with the bus clock BCK.

Particularly, the calculator 66 is configured to select, as the comparison value:

the half-period count value $C_i/2$ before the occurrence of the first output of the comparator 67 after the occurrence of the first target edge;

the sum ($C_{of}+C_i/2$) of the offset value $C_{of}$ and the half-period count value $C_i/2$ after the occurrence of the first target edge; and the half-period count value $C_i/2$ after a number of the target edges corresponding to the number of bits (10 bits) of the block of transmission data TXD have been selected by the edge selector 64.

Figure 12:
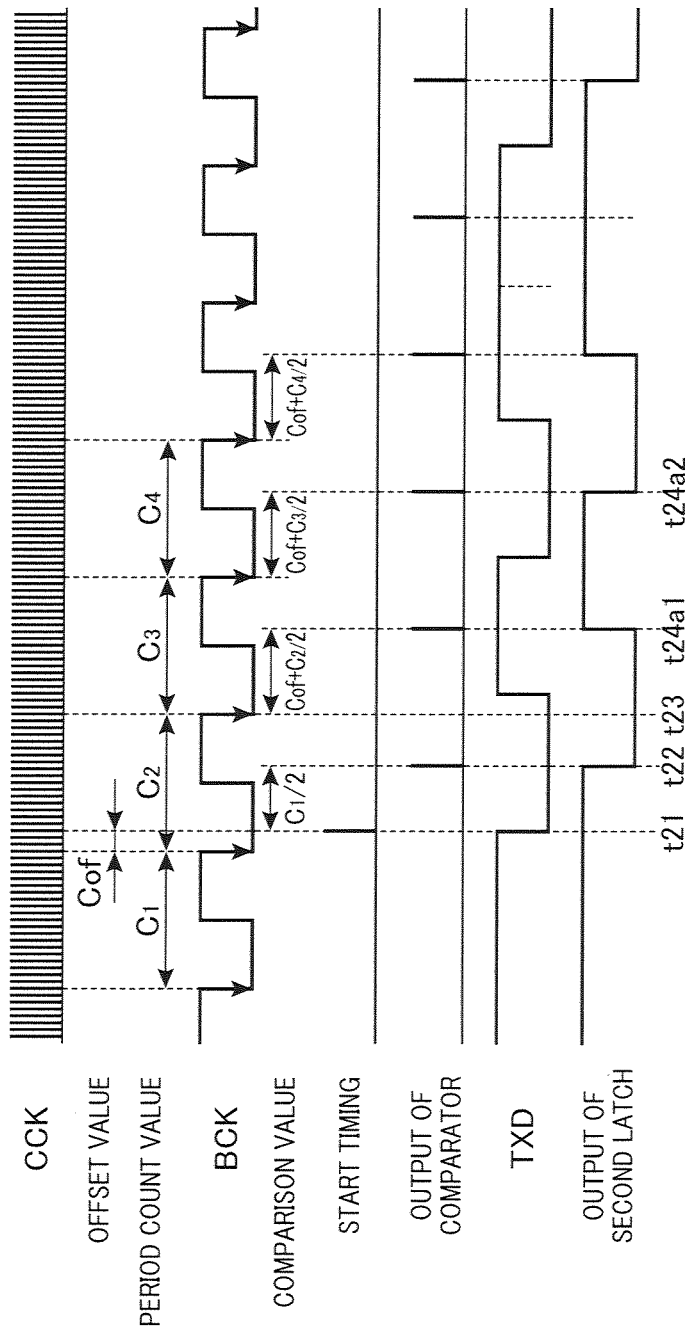
FIG. 12 is a timing chart schematically illustrating an example of operations of the synchronizing circuit illustrated in FIG. 11.

Specifically, as illustrated in FIG. 12, when the start edge of the start bit of transmission data TXD supplied from the signal processor 10 is detected by the start-bit detector 62 at time t21, a current count value of the counter 61 at the time t21 is latched by the first latch 63 as the offset value $C_{of}$. Because an edge of the bus clock BCK immediately before the occurrence of the start bit is a falling edge, the falling edge is selected as the target edge by the edge selector 64.

Before the first target edge (first falling edge) of the bus clock BCK appears (time t23) after the occurrence of the start timing, the comparison value of the calculator 66 is maintained as the half-period count value $C1/2$ (i=1). Thus, when the comparison value ($C1/2$) is in agreement with the count value of the second counter 65 at time t22, the second latch 63 samples (latches) a signal level (a bit) of transmission data TXD at the time t22, so that the output of the second latch 65 is held at the sampled data of the transmission data TXD at the time t22.

After the occurrence of the first target edge (first falling edge) of the bus clock BCK appears at the time t23, the count value of the second counter 65 is reset, and the comparison value of the calculator 66 is set to the sum "($C_{of}+C2/2$)" of the offset value $C_{of}$ and the half-period count value $C2/2$ (i=2). Then, when the comparison value ($C_{of}+C2/2$) is in agreement with the count value of the second counter 65 at time t24a1, the second latch 63 samples (latches) a signal level (a bit) of transmission data TXD at the time t24a1, so that the output of the second latch 65 is held at the sampled data of the transmission data TXD at the time t24a1.

That is, the second latch 65 samples (latches) a signal level (a bit) of the transmission data TXD each time (t24a1, t24a2, t24a9) a count value of the second counter 65 is in agreement with the comparison value ($C_{of}+C2/2$, $C_{of}+C3/2$, $C_{of}+C9/2$), so that the output of the second latch 68 is held at the sampled data of the transmission data TXD at each time (t24a1, t24a2, t24a9).

At that time, the third latch 69 samples (latches) the output of the second latch 68 at each falling edge of the bus clock BCK, thus generating synchronized transmission data dTXD synchronized with the bus clock BCK.

That is, because the period count value $C_i$ of the counter 21b represents the period of the internal clock CK, that is, the bus clock BCK, it is possible to determine the sampling timing (sampling position) of each bit of transmission data TXD at the middle or its vicinity of the duration of a corresponding bit thereof. Thus, it is possible to achieve the same effects as the communication system of the second embodiment dose.

In the third embodiment, the counter 21b of each of the timing generators 21 and 41 serves as an example of a counter of a sampling timing generator of the third structural type of the first exemplary aspect of the present disclosure, and the first counter 61 and the first latch 63 serve as an example of an offset-value generator of the sampling timing generator of the third structural type of the first exemplary aspect of the present disclosure. The second and third latches 68 and 69 serve as an example of first and second latches of a sampling module of the third structural type of the first exemplary aspect of the present disclosure.

The first to third embodiments of the present disclosure have been described, but the present disclosure is not limited to these embodiments, and therefore the present disclosure can include various modifications of each of the first to third embodiments within the scope thereof.

In the first embodiment, a signal consisting of periodic pulse-like waves is used as the sampling clock SCK, and the rising edges of the sampling clock SCK as the sampling edges for sampling transmission data TXD, but the present disclosure is not limited thereto.

Specifically, a signal having a 50% duty cycle can be used as the sampling clock SCK, and the rising and falling edges of the signal can be used as the sampling edges for sampling transmission data TXD.

While illustrative embodiments of the present disclosure have been described herein, the present disclosure is not limited to the embodiment described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A transceiver comprising:
    a first clock generator configured to locally generate a first clock, the transceiver communicating a digital signal encoded to include information of the first clock through a communication bus;
    a second clock generator configured to generate a second clock synchronized with the first clock, the second clock having a period corresponding to a duration of one bit of a digital signal on the communication bus;
    a sampling timing generator configured to, when first transmission data is supplied to the transceiver with being asynchronous to the second clock, detect start data of the first transmission data as a start timing, and generate sampling timings in response to the start timing, the sampling timings having intervals each of which is defined to correspond to the period of the second clock, the first sampling timing in the sampling timings being spaced from the start timing;
    a first sampling module configured to sample, at each of the sampling timings, the first transmission data, thus generating second transmission data;
    a second sampling module configured to sample, at each falling edge of the second clock, the second transmission data generated by the first sampling module, thus generating third transmission data synchronized with the second clock; and
    a transmitter configured to encode the third transmission data to a digital signal including information of the first clock, and transmit the digital signal through the communication bus.

2. The transceiver according to claim 1, wherein the second clock generator is configured to generate a multiplication clock having N level-transition edges as sampling edges within each cycle of the second clock where the N is an integer equal to or greater than 3, and the sampling timing generator is configured to generate a corresponding one of the sampling timings each time a (P+k·N)-th sampling edge of the multiplication clock occurs after detection of the start timing where P=(N+1)/2 when N is an odd number and P=(N+2)/2 when N is an even number, and k is 0, 1, 2, . . . , KLIM where KLIM is an upper limit of the k which is determined based on a length of the transmission data.

3. The transceiver according to claim 1, wherein the sampling timing generator further comprises a counter configured to count the duration of one bit of the digital signal according to the first clock as a period count value, and
    wherein the sampling timing generator is configured to:
    generate the first sampling timing at a timing when a half of the period count value corresponding to the duration of one bit of the digital signal is reached by the counter; and
    generate, after generation of the first sampling timing, a corresponding one of the remaining sampling timings each time the period count value corresponding to the duration of one bit of the digital signal is reached by the counter.

4. The transceiver according to claim 1, wherein the sampling timing generator further comprises:
    a counter configured to count the duration of one bit of the digital signal according to the first clock as a period count value; and
    an offset-value generator configured to generate an interval between a target edge and the start timing, the target edge is a level-transition edge in the second clock occurring immediately before the start timing, and
    wherein the sampling timing generator is configured to:
    generate the first sampling timing at a timing when a half of the period count value corresponding to the duration of one bit of the digital signal is reached by the counter; and
    generate, after generation of the first sampling timing, a corresponding one of the remaining sampling timings each time the sum of the offset value and the half of the period count value is reached by the counter in response to an occurrence of a corresponding level transition edge in the second clock corresponding to the target edge.

5. The transceiver according to claim 1, wherein the second clock is different from the first clock.

6. The transceiver according to claim 1, wherein the second sampling module is separate from the first sampling module.

7. The transceiver according to claim 2, wherein the sampling timing generator comprises:
    a start-timing detector configured to detect the start data of the first transmission data as the start timing; and
    a generating module configured to measure a period until a (P+k·N)-th sampling edge of the multiplication clock has occurred since detection of the start timing, and generate a corresponding one of the sampling timings each time the period is measured, and
    wherein the first sampling module further comprises a first latch configured to latch, at each of the sampling timings, a corresponding bit of the first transmission data, thus generating second transmission data; and
    the second sampling module further comprises a second latch connected in series to the first latch and configured to latch a corresponding one of the latched bits of the second transmission data by the first latch at a timing synchronized with each level-transition edge of the second clock, thus generating the third transmission data.

8. The transceiver according to claim 3, wherein the sampling timing generator further comprises:
a start-timing detector configured to detect the start data of the first transmission data as the start timing; and
a generating module configured to generate a corresponding one of the remaining sampling timings each time the period count value corresponding to the duration of one bit of the digital signal is reached by the counter, and
wherein the first sampling module further comprises
a first latch configured to latch, at each of the sampling timings, a corresponding bit of the first transmission data, thus generating second transmission data; and
the second sampling module further comprises a second latch connected in series to the first latch and configured to latch a corresponding one of the latched bits of the first latch at a timing synchronized with each level-transition edge of the second clock, thus generating the third transmission data.

9. The transceiver according to claim 4, wherein the sampling timing generator further comprises:
a start-timing detector configured to detect the start data of the first transmission data as the start timing; and
a generating module configured to generate a corresponding one of the remaining sampling timings each time the sum of the offset value and the half of the cyclic-count value is reached by the counter in response to an occurrence of a corresponding level transition edge in the second clock corresponding to the target edge, and
wherein the first sampling module further comprises
a first latch configured to latch, at each of the sampling timings, a corresponding bit of the first transmission data, thus generating second transmission data; and
the second sampling module further comprises a second latch connected in series to the first latch and configured to latch a corresponding one of the latched bits of the first latch at a timing synchronized with each level-transition edge of the second clock, thus generating the third transmission data.

10. A communication system comprising:
a communication bus; and
a plurality of nodes communicably coupled to each other through the bus, each of the plurality of nodes comprising:
a transceiver comprising:
a first clock generator configured to locally generate a first clock, the transceiver communicating a digital signal encoded to include information of the first clock through the communication bus;
a second clock generator configured to generate a second clock synchronized with the first clock, the second clock having a period corresponding to a duration of one bit of a digital signal on the communication bus;
a sampling timing generator configured to, when first transmission data is supplied to the transceiver with being asynchronous to the second clock, detect start data of the first transmission data as a start timing, and generate sampling timings in response to the start timing, the sampling timings having intervals each of which is defined to correspond to the period of the second clock, the first sampling timing in the sampling timings being spaced from the start timing;
a first sampling module configured to sample, at each of the sampling timings, the first transmission data, thus generating second transmission data;
a second sampling module configured to sample at each falling edge of the second clock, the second transmission data generated by the first sampling module, thus generating third transmission data synchronized with the second clock; and
a transmitter configured to encode the third transmission data to a digital signal including information of the first clock, and transmit the digital signal through the communication bus.

11. The communication system according to claim 10, wherein the second clock generator is configured to generate a multiplication clock having N level-transition edges as sampling edges within each cycle of the second clock where the N is an integer equal to or greater than 3, and the sampling timing generator is configured to generate a corresponding one of the sampling timings each time a (P+k·N)-th sampling edge of the multiplication clock occurs after detection of the start timing where P=(N+1)/2 when N is an odd number and P=(N+2)/2 when N is an even number, and k is 0, 1, 2, . . ., KLIM where KLIM is an upper limit of the k which is determined based on a length of the transmission data.

12. The communication system according to claim 10, further comprising:
a counter configured to count the duration of one bit of the digital signal according to the first clock as a period count value,
wherein the sampling timing generator is configured to:
generate the first sampling timing at a timing when a half of the period count value corresponding to the duration of one bit of the digital signal is reached by the counter; and
generate, after generation of the first sampling timing, a corresponding one of the remaining sampling timings each time the period count value corresponding to the duration of one bit of the digital signal is reached by the counter.

13. The communication system according to claim 10, further comprising:
a counter configured to count the duration of one bit of the digital signal according to the first clock as a period count value; and
an offset-value generator configured to generate an interval from a target edge and the start timing, the target edge being a level-transition edge in the second clock occurring immediately before the start timing,
wherein the sampling timing generator is configured to:
generate the first sampling timing at a timing when a half of the period count value corresponding to the duration of one bit of the digital signal is reached by the counter; and
generate, after generation of the first sampling timing, a corresponding one of the remaining sampling timings each time the sum of the offset value and the half of the cyclic-count value is reached by the counter in response to an occurrence of a corresponding level transition edge in the second clock corresponding to the target edge.

14. The transceiver according to claim 10, wherein the second clock is different from the first clock.

15. The transceiver according to claim 10, wherein the second sampling module is separate from the first sampling module.

* * * * *